(12) United States Patent
Mekkattuparamban et al.

(10) Patent No.: US 11,438,236 B2
(45) Date of Patent: *Sep. 6, 2022

(54) METHODS AND SYSTEMS FOR MANAGING CONNECTED DATA TRANSFER SESSIONS

(71) Applicant: Cisco Technology, Inc., San Jose, CA (US)

(72) Inventors: Joji Thomas Mekkattuparamban, Sunnyvale, CA (US); Suraj Nellikar, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/015,395

(22) Filed: Sep. 9, 2020

(65) Prior Publication Data

US 2020/0412618 A1    Dec. 31, 2020

Related U.S. Application Data

(63) Continuation of application No. 14/794,523, filed on Jul. 8, 2015, now Pat. No. 10,791,031.

(Continued)

(51) Int. Cl.
*H04L 12/24* (2006.01)
*H04L 41/0896* (2022.01)
(Continued)

(52) U.S. Cl.
CPC ...... *H04L 41/0896* (2013.01); *H04L 43/0876* (2013.01); *H04W 76/34* (2018.02); *H04L 43/106* (2013.01); *H04L 43/16* (2013.01)

(58) Field of Classification Search
CPC ............ H04L 41/0896; H04L 43/0876; H04L 43/106; H04L 43/16; H04W 76/34
See application file for complete search history.

(56) References Cited

U.S. PATENT DOCUMENTS 6,839,767 B1    1/2005 Davies et al.
8,400,971 B1 *  3/2013 Narendran .......... H04L 65/1083
                                            370/329

(Continued)

FOREIGN PATENT DOCUMENTS

DE    102013104383    10/2014
WO        9723073    12/1996

OTHER PUBLICATIONS

International Search Report and Written Opinion dated Jul. 21, 2016 for corresponding PCT Application No. PCT/US2016/034689.

*Primary Examiner* — Gil H. Lee
*Assistant Examiner* — Juan C Turriate Gastulo
(74) *Attorney, Agent, or Firm* — Polsinelli PC

(57) ABSTRACT

Systems, methods, and computer-readable storage media are provided for managing connected data transfer sessions in a computing network. A controller included in the computing network can monitor connected data transfer sessions to determine whether a predetermined threshold has been met or exceeded and, if so, terminate at least one connected data transfer session in the computing network. The threshold can include a threshold number of connected data communication sessions and/or a threshold amount of resources utilized by the connected data communication sessions. The controller can terminate connected data transfer sessions until the total number of connected data communication sessions and/or threshold amount of resources falls below the threshold.

18 Claims, 7 Drawing Sheets

Related U.S. Application Data

(60) Provisional application No. 62/167,796, filed on May 28, 2015.

(51) Int. Cl.
*H04L 43/0876* (2022.01)
*H04W 76/34* (2018.01)
*H04L 43/16* (2022.01)
*H04L 43/106* (2022.01)

(56) References Cited

U.S. PATENT DOCUMENTS

| | | | |
|---|---|---|---|
| 9,274,710 B1 * | 3/2016 | Oikarinen | G06F 3/067 |
| 9,413,454 B1 * | 8/2016 | Reddy Bovilla | H04L 41/0896 |
| 9,473,413 B1 | 10/2016 | Cao et al. | |
| 9,712,374 B1 * | 7/2017 | Cao | H04L 29/08072 |
| 10,554,761 B2 | 2/2020 | Hall | |
| 2006/0089996 A1 | 4/2006 | Peiffer | |
| 2008/0002711 A1 * | 1/2008 | Bugenhagen | H04W 28/18 370/395.2 |
| 2009/0055501 A1 | 2/2009 | Wang et al. | |
| 2011/0320544 A1 | 12/2011 | Yee et al. | |
| 2012/0317273 A1 | 12/2012 | Shankarappa | |
| 2013/0072146 A1 * | 3/2013 | Smith | H04W 28/0215 455/404.1 |
| 2014/0219287 A1 | 8/2014 | Birke et al. | |
| 2014/0241247 A1 * | 8/2014 | Kempf | H04L 12/4641 370/328 |
| 2015/0082382 A1 * | 3/2015 | Maguire | H04L 69/18 726/3 |
| 2016/0234109 A1 * | 8/2016 | Iovanna | H04L 41/12 |
| 2016/0254959 A1 * | 9/2016 | Arndt | H04L 41/0896 370/235 |

* cited by examiner

METHODS AND SYSTEMS FOR MANAGING CONNECTED DATA TRANSFER SESSIONS

CROSS-REFERENCE TO RELATED APPLICATIONS

This application claims the benefit of, and priority to, U.S. Non-Provisional patent application Ser. No. 14/794,523, filed Jul. 8, 2015, which claims the benefit of U.S. Provisional Patent Application No. 62/167,796, filed May 28, 2015, which are incorporated herein by reference in their entireties.

TECHNICAL FIELD

The present disclosure relates generally to computer networks, and more specifically to management of connected data transfer sessions.

BACKGROUND

Modern computing networks operate with an increasing number of computing nodes to support a wide variety of applications and services. Computing nodes in the networks may include a switch (e.g., a router) or an end point (e.g., a host device). Nodes in a computing network can communicate with each other to transfer data. Communications between the computing nodes can be facilitated using an available protocol. For example, communications can be performed using protocols that provide connected data transfer sessions between computing nodes, such as the Transmission Control Protocol (TCP). A connected data transfer session can be an established connection between computing nodes to transfer data. To establish a connected data transfer session, a negotiation can be performed between the computing nodes to establish a socket to socket virtual connection that remains open throughout the duration of the connected data transfer session. An advantage of a connected data transfer session is that the recipient computing node acknowledges each received packet and packet retransmissions can be performed if packets are missed or arrive out of order. In contrast, protocols that do not require the establishment of a connection, such as Internet Protocol (IP), do not provide acknowledgement for received packets. As a result, these protocols can result in an unreliable packet delivery system where packets can arrive out of order or not at all.

While connected data transfer sessions provide a reliable packet delivery system, they can also present some challenges. For example, each connected data transfer session utilizes some amount of resources, such as bandwidth, until the connected data transfer session is terminated. As a result, a high number of connected data transfer sessions, even if not being used to transfer data, can reduce available resources and lead to network congestion, such as blocking new connections, queueing delays or packet loss. Current systems rely on users to manage terminating connected data transfer sessions when they are no longer needed or are being unused. If not terminated, 'inactive' connected data transfer sessions (e.g., connected data transfer sessions that are not being used to transfer data) can continue to utilize resources.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which.

DESCRIPTION OF EXAMPLE EMBODIMENTS

Figure 1:
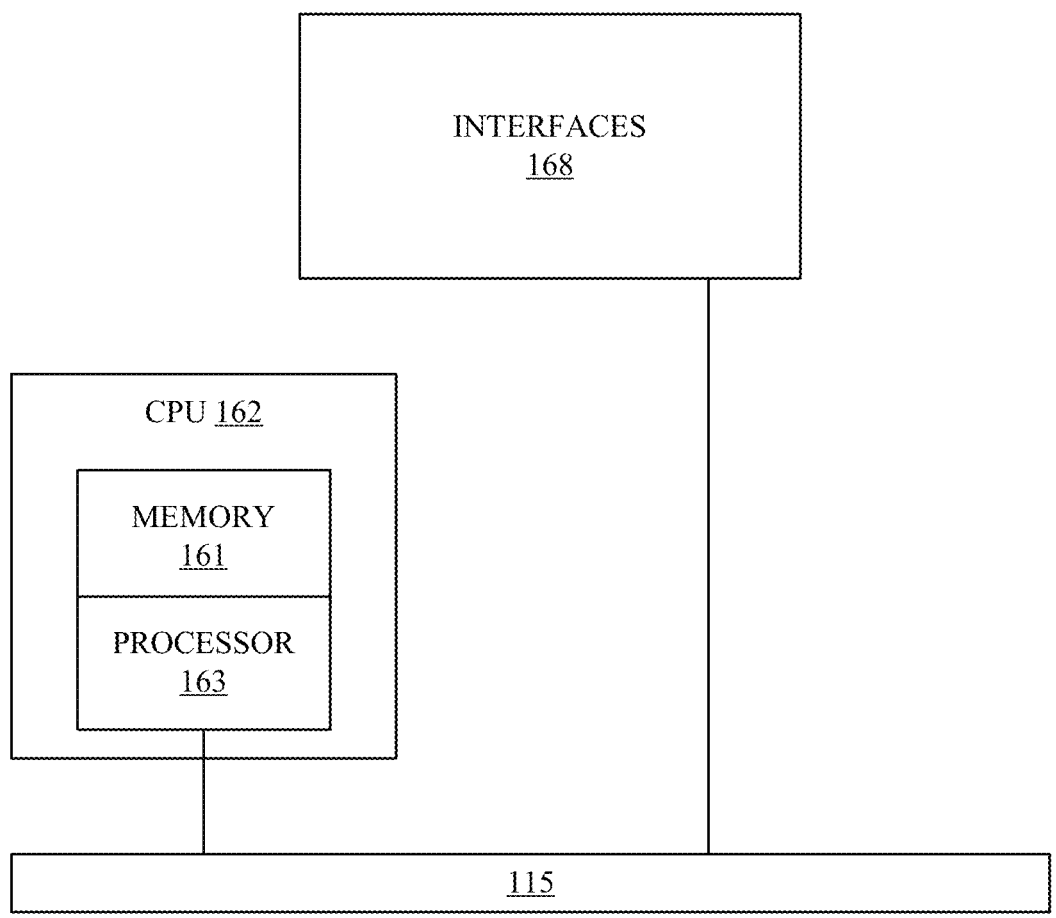
FIG. 1 illustrates an example network device according to some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Disclosed are systems, methods, and computer-readable storage media for managing connected data transfer sessions in a computing network. Various embodiments of the present technology can be used to monitor and terminate connected data transfer sessions as needed to manage network resource usage. For example, a controller comprising of one or more computing nodes in a network can be configured to monitor the number of connected data transfer sessions between computing nodes of the network and determine whether the number of connected data transfer sessions meets or exceeds a threshold number and, if so, terminate one or more connected data transfer session until the number of connected data transfer sessions falls below the threshold number. Terminating a connected transfer session can include terminating the socket to socket virtual connection between the computing the nodes associated with the connected data transfer session.

In some embodiments, the controller can be configured to monitor resource usage by the connected data transfer sessions (e.g., bandwidth) and determine whether a total resource usage meets or exceeds a threshold resource usage amount. If so, the controller can terminate one or more of the connected data transfer sessions until the total resource usage is below the threshold resource usage amount.

The controller can determine which connected data transfer sessions to terminate in numerous ways and based on multiple factors. For example, the controller can terminate the connected data transfer sessions based on a timestamp value associated with each data transfer session. A timestamp value can indicate the time at which the latest data packet was transmitted using the data transfer session. The controller can terminate the connected data transfer session based on the times stamp values such that the connected data transfer session with the earliest timestamp value (e.g., the data transfer session that has remained unused the longest) is terminated.

In some embodiments, the controller can rank the connected data transfer sessions and select a connected data transfer session to terminate based on the ranking. For example, the controller can rank the connected data transfer sessions based one or more factors, such as timestamp values, priority values assigned to the connected data transfer sessions, the computing nodes utilizing the connected data transfer sessions, etc. The controller can then select the data transfer session with the lowest ranking to be terminated.

Detailed Description

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

FIG. 1 illustrates an exemplary network device 110 suitable for implementing the present technology. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform routing computations, network diagnostics, security functions, etc.

Although the system shown in FIG. 1 is one specific network device of the present technology, it is by no means the only network device architecture on which the present technology can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
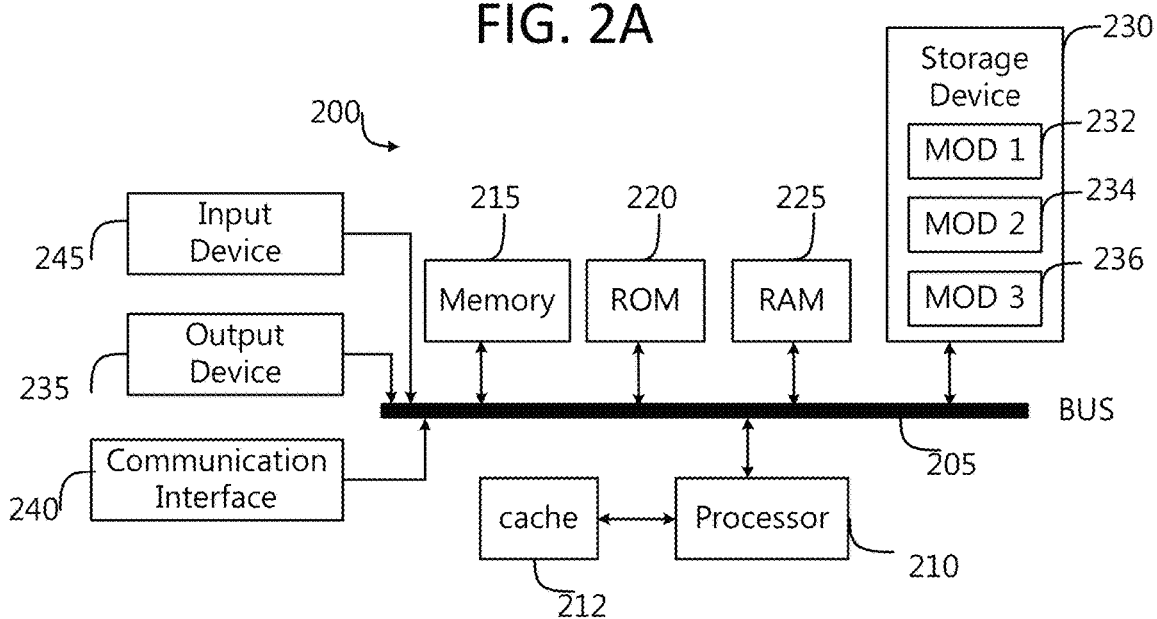
FIGS. 2A and 2B illustrate an example system embodiments according to some aspects of the subject technology.
Figure 2B:
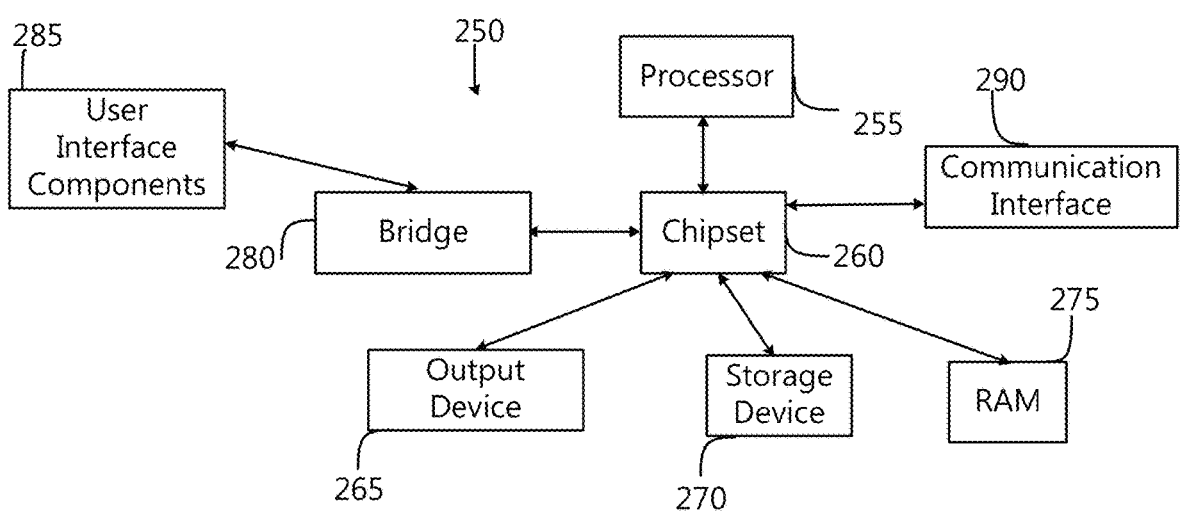

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
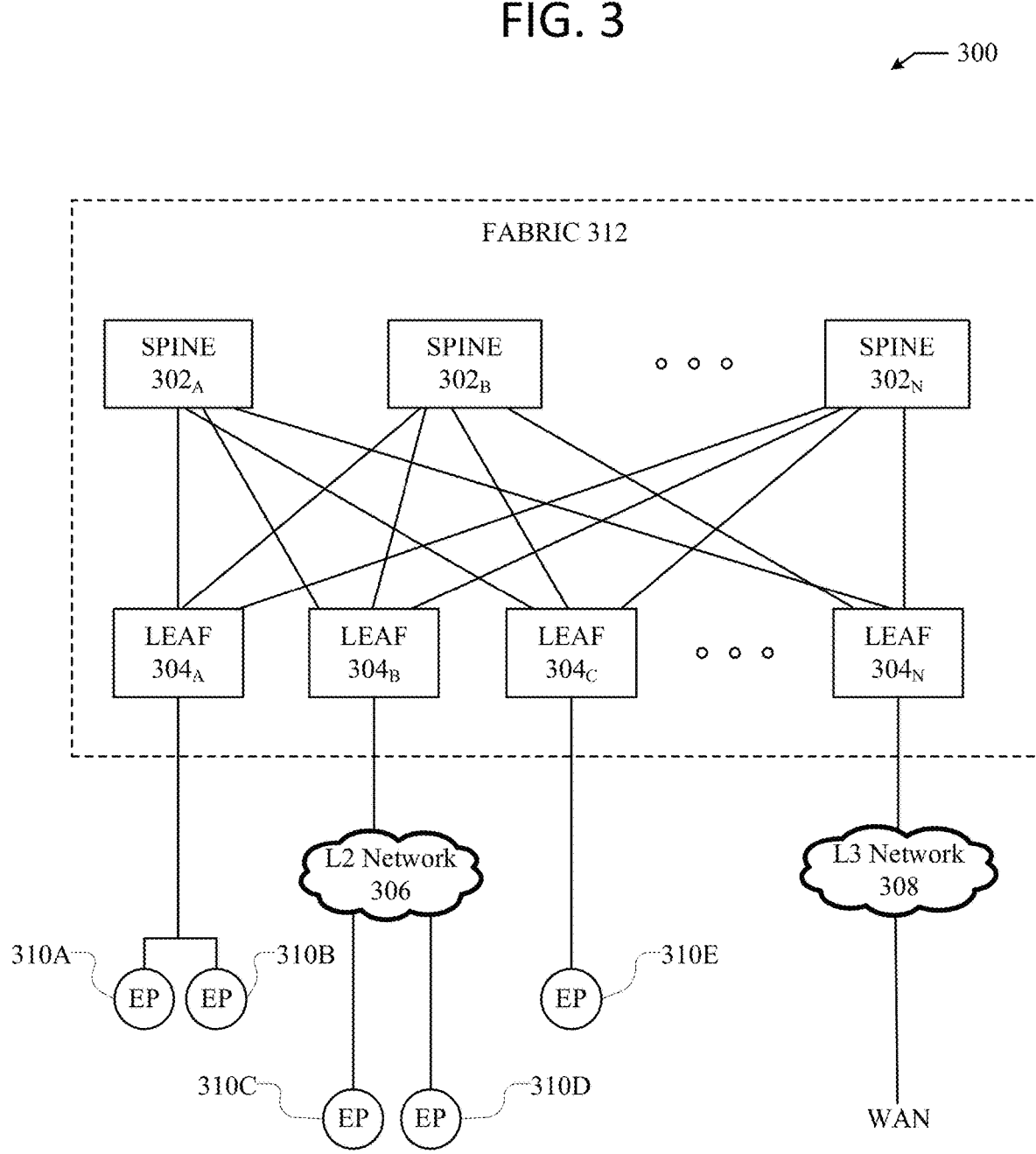
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, ..., $302_N$ (collectively "302") connected to leaf switches $304_A$, $304_B$, $304_C$ ... $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch 3021 can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
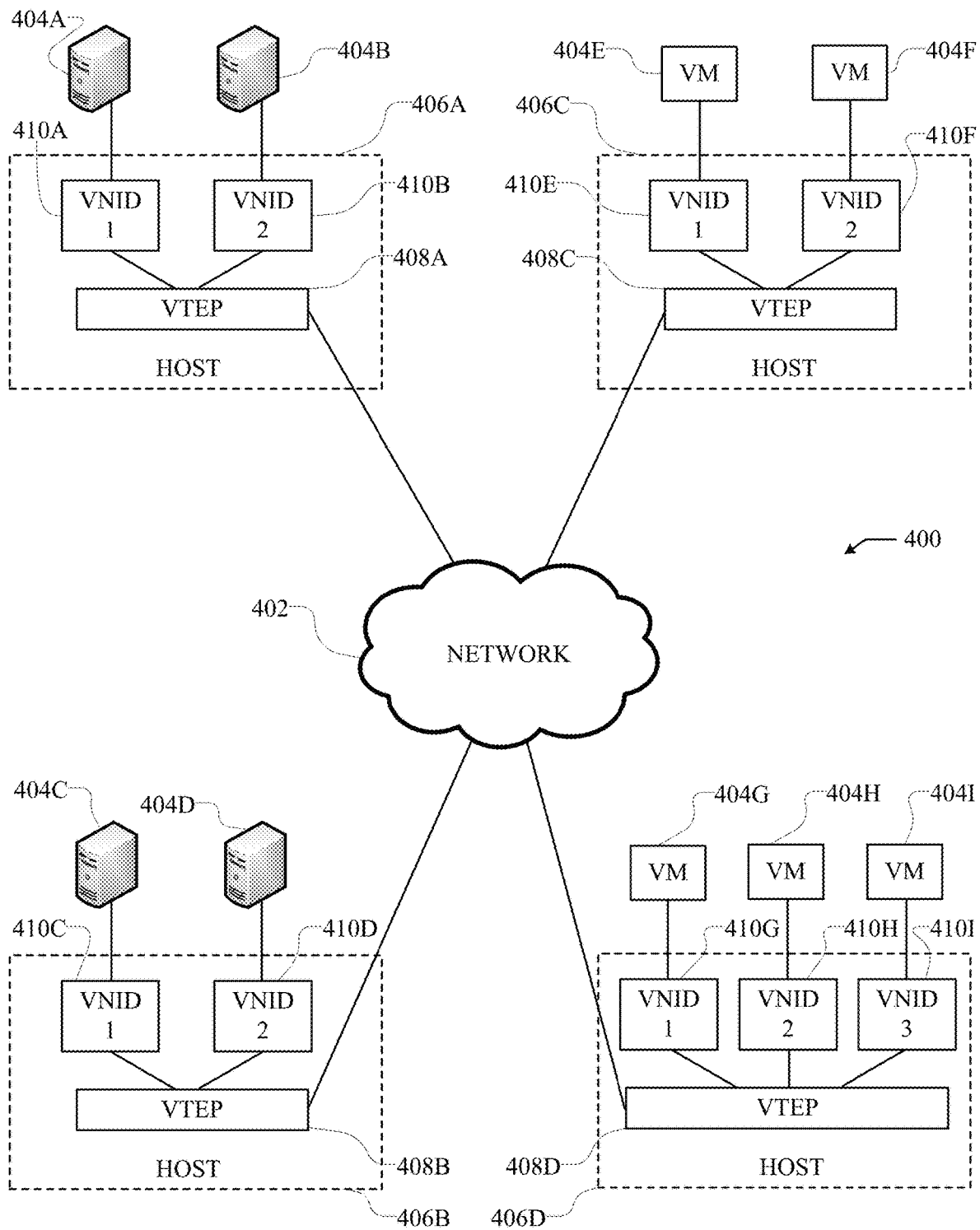
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Depending on the desired implementation in the network 400, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the network 400 illustrated in FIG. 4 is used for purposes of explanation, a network system may be implemented with many variations, as appropriate, in the configuration of network platform in accordance with various embodiments of the present disclosure.

Figure 5:
FIG. 5 illustrates an example system embodiment of a controller configured to manage connected data transfer session in a computing network.

FIG. 5 illustrates an example system embodiment of a controller configured to manage connected data transfer session in a computing network. The controller 500 can be made up of one or more computing nodes in a computing network. For example, the controller 500 can be made up of one or more switches, routers, end points, computing devices, etc., or combination thereof in the computing network.

The controller 500 can be configured to monitor connected data transfer sessions in the computing network. A connected data transfer session can be an established connection between computing nodes to transfer data. For example, a connected data transfer session can be implemented using a protocol such as the Transmission Control Protocol (TCP). To establish a connected data transfer session, a negotiation can be performed between the computing nodes to establish a socket to socket virtual connection that remains open throughout the duration of the connected data transfer session.

The controller 500 can include a management module 502 configured to monitor the connected data transfer sessions between computing nodes of the computing network and terminate connected data transfer sessions as needed to manage network resource usage. For example, in some embodiments, the management module 502 can be configured to determine whether a total number of connected data transfer session meets or exceeds a threshold number and, if so, terminate connected data transfer sessions until the total number of connected data transfer session falls below the threshold number.

As another example, in some embodiments, the management module 502 can be configured to monitor resource usage (e.g., bandwidth, processing, etc.) by the connected data transfer sessions and determine whether the total resource usage meets or exceeds a threshold amount. If the total resource usage does meet or exceed the threshold amount, the management module 502 can terminate connected data transfer sessions until the total resource usage falls below the threshold amount.

In some embodiments, the management module 502 can be configured to monitor both the number of connected data transfer sessions and resource usage by the connected data transfer sessions to determine whether the total number of connected data transfer sessions or the total resource usage exceeds the threshold number or threshold amount respectively. If either threshold is met or exceeded, the management module 502 can terminate connected data transfer sessions until the total number of connected data transfer sessions and the total resource usage fall below their respective threshold.

In some embodiments, the threshold number of connected data transfer sessions and the threshold amount of resource usage can be dynamic. For example, the management module 502 can adjust the thresholds based on anticipated use of connected data transfer sessions and/or anticipated resource usage. The management module 502 can lower on or more of the thresholds if the anticipated use is high and, conversely, raise one or more of the thresholds if the anticipated use is low. For example, if the management module 502 determines that requests to establish connected data transfer sessions are being received at a higher than average rate, the management module 502 can lower the threshold number to ensure that other connected data transmission sessions are terminated sooner to facilitate the new requests. As another example, if the management module 502 determines that requests to establish connected data transfer sessions are being received at a lower than average rate, the management module 502 can increase the threshold number.

Terminating a connected data transfer session can include terminating the socket to socket virtual connection between the computing nodes utilizing the connected data transfer session, thereby freeing the resources used by the connected data transfer session. In some embodiments, the management module 502 can terminate a connected data transfer session by transmitting a termination message to each computing node utilizing the connected data transfer. The termination message can instruct the computing nodes to terminate the connected data transfer session.

Alternatively, in some embodiments, the management module 502 can transmit a termination message to one of the computing nodes utilizing the connected data transfer session. The termination message can instruct the computing node to terminate the connected data transfer session as well as send a message to the other computing nodes utilizing the connected data transfer session to instruction the other computing nodes to terminate the connected data transfer session.

The management module 502 can select connected data transfer sessions to terminate in any number of ways. For example, in some embodiments, the management module 502 can select connected data transfer sessions at random to be terminated. As another example, the management module 502 can select connected data transfer sessions to terminate based on time stamp values associated with the connected data transfer sessions. A time stamp value for a connected data transfer session can indicate the time at which the latest data packet was transmitted using the data transfer sessions. The time stamp value for a connected data transfer session can be updated each time the connected data transfer session is used to transmit a data packet.

The management module 502 can terminate a connected data transfer session to terminate based on the time stamp values. For example, the management module 502 can be configured to terminate the connected data transfer session with the earliest time stamp value. As a result, the management module 502 will terminate the connected data transfer session that has remained unused the longest.

As another example, the management module 502 can terminate any connected data transfer session with a time stamp value that is earlier than a threshold time value, regardless of which timestamp value is the earliest overall. As a result, the management module 502 can terminate any connected data transfer session that has remained unused for at least a specified period of time. In some embodiments, the threshold time value can be a dynamic value based on a current time value. For example, the threshold time value can be a specified amount of time prior to the current time value, such as 5 minutes prior to the current time value. Using this example, the management module 502 can terminate any connected data transfer session that has remained unused for at least 5 minutes.

In some embodiments, the management module 502 can select a connected data transfer session to terminate based on applications, services, computer nodes and/or users utilizing the connected data transfer session. For example, some application, services, computer nodes and/or users utilizing can be considered high priority, while other applications, services, computer nodes and/or users can be considered lower priority. The management module 502 can identify and terminate connected data transfer sessions that are utilized by applications, services, computer nodes and/or uses considered to be low priority. In some embodiments, some applications, services, computer nodes and/or users can be considered such high priority that the management module 502 will not terminate connected data transfer sessions utilized by these applications, services, computer nodes and/or users.

In some embodiments, the management module 502 can select a connected data transfer session to terminate based on user assigned priority values for the connected data transfer sessions. For example, a user may assign or flag a connected data transfer session to indicate the priority level of the connected data transfer session, such as high priority, mid priority or low priority. The management module 502 can select a connected data transfer session to terminate based on the assigned priority levels such that the management module terminates a connected data transfer session assigned or flagged with a lowest assigned priority level. In some embodiments, a user can flag a connected data transfer session to indicate that the connected data transfer session should not be terminated and the management module 502 can be configured to not terminate these connected data transfer sessions.

In some embodiments, the management module 502 can select connected data transfer sessions to terminate based on a ranking of the connected data transfer session. The ranking can be based on one or more factors and can indicate an order in which the connected data transfer sessions should be terminated. The controller 500 can include a ranking module 504 configured to rank the connected data transfer sessions and provide the ranking to the management module 502. The management module 502 can then terminate connected data transfer sessions based on the ranking.

In some embodiments, the ranking module 504 can rank all of the connected data transfer sessions. Alternatively, in some embodiments, the ranking module 504 can rank a subset of the connected data transfer sessions. For example, the ranking module 504 can rank the connected data transfer sessions that have not been flagged or otherwise indicated as being high priority and/or to not be terminated.

The ranking module 504 can rank the connected data transfer sessions based on any number of factors, such as timestamp values, assigned priority levels, applications, services, computer nodes and/or users utilizing, etc. Further, the ranking module 504 can apply varying weights to the various factors when determining the ranking.

The resulting ranking can indicate an order in which the connected data transfer sessions are to be terminated. For example, the ranking module 504 can rank the connected data transfer session such that the connected data transfer sessions should be terminated in descending order from the highest ranked to the lowest ranked. Alternatively, the ranking module 504 can rank the connected data transfer session such that the connected data transfer sessions should be terminated in ascending order from the lowest ranked to the highest ranked.

In some embodiments, the ranking module 504 can continuously rank the connected data transfer session. For example, the ranking module 504 can gather data based on a set schedule, such as every 1 second, 2 seconds, etc., and a re-rank or update the ranking based on the gathered data. Alternatively, in some embodiments, the ranking module 504 can re-rank or update the ranking each time the management module 502 determines that the total number of connected data transfer sessions or the total resource usage of the connected data transfer sessions exceeds its respective threshold.

The management module 502 can terminate connected data transfer session until the total number of connected data transfer sessions and/or the total resource usage of the connected data transfer sessions falls below the threshold number or threshold amount respectively. This can include terminating just enough connected data transfer session to fall below the threshold or, alternatively, this can include terminating more connected data transfer sessions than are necessary to fall below the threshold. For example, the management module 502 can terminate all connected data transfer sessions with a time stamp value earlier than a threshold time value, even if terminating only a subset of these connected data transfer sessions would be sufficient to bring the total number of connected data sessions or the total resource usage below its respective threshold. As another example, the management module 502 can terminate all of the connected data transfer sessions with a ranking below a threshold ranking. As another example, the management module 502 can terminate all of the connected data transfer sessions with a priority level lower than a threshold priority level.

In some embodiments, the management module 502 may terminate fewer connected data transfer sessions than are necessary to fall below a threshold. For example, the management module 502 can be configured to not terminate a connected data transfer sessions if the time stamp value for the connected data transfer session is later than a threshold time value, if the ranking for the connected data transfer session is greater than a threshold ranking and/or if the priority level of the connected data transfer session if above a threshold priority level, even if enforcing this policy results in the total number of connected data transfer sessions or the total resource usage remaining at or above its respective threshold. As a result, connected data transfer sessions determined to be of high value and/or that are being actively used will not be terminated, even if doing so causes some level of network congestions.

Figure 6:
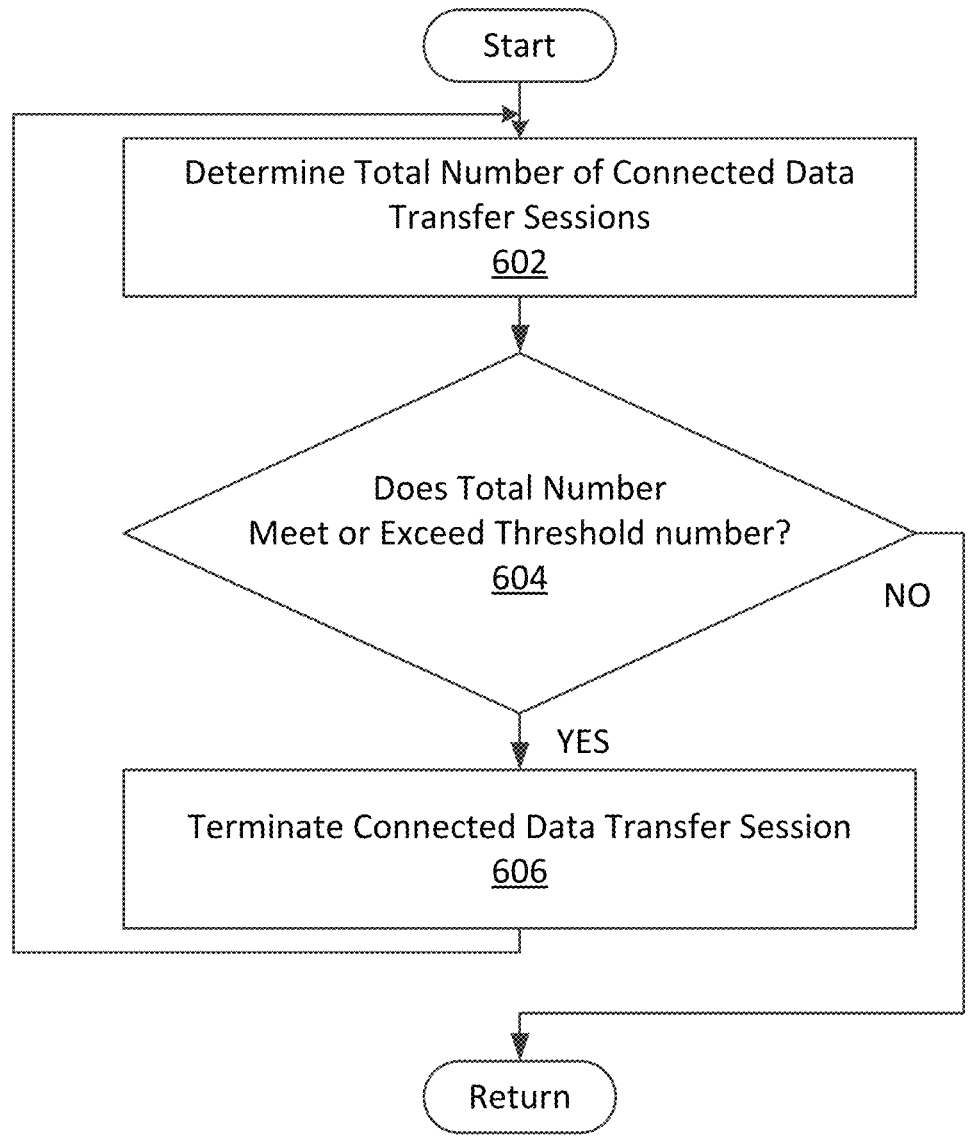
FIG. 6 illustrates one example method of a controller managing connected data transfer sessions in a computing network.
Figure 7:
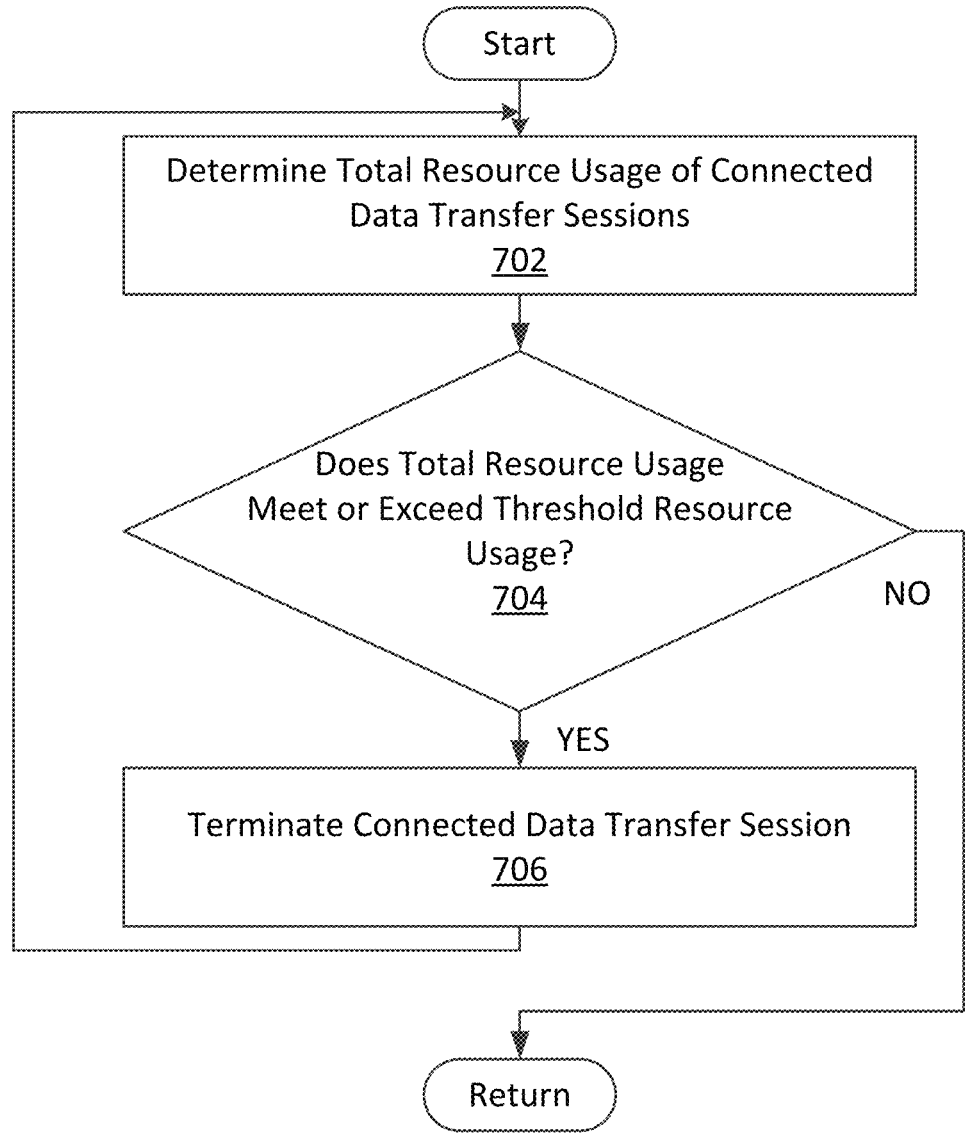
FIG. 7 illustrates another example method of a controller managing connected data transfer sessions in a computing network.

Having disclosed some basic system components and concepts, the disclosure now turns to the example methods shown in FIGS. 6 and 7. For the sake of clarity, the methods are described in terms of systems shown in FIGS. 1-5. The steps outlined herein are example and can be implemented in any combination thereof, including combinations that exclude, add, or modify certain steps.

FIG. 6 illustrates one example method of a controller 500 managing connected data transfer sessions in a computing network. At step 602, a controller 500 can determine a total number of connected data transfer sessions between computing nodes in a computing network.

At step 604, the controller 500 can determine whether the total number of connected data transfer sessions meets or exceeds a threshold number of connected data transfer session. If the controller determines the total number of connected data transfer sessions meets or exceeds the threshold number of connected data transfer session, the method can continue to step 606 where the controller 500 can terminate a connected data transfer session. The controller 500 can terminate a connected data transfer session based on one or more factors, such as a timestamps value, assigned priority, ranking, etc. The method can then return to step 602.

FIG. 7 illustrates another example method of a controller managing connected data transfer sessions in a computing network. At step 702, a controller 500 can determine a total amount of resources used by connected data transfer sessions in a computing network.

At step 704, the controller 500 can determine whether the total amount of resources meets or exceeds a threshold amount of resources. If the controller determines the total amount resourced does meets or exceeds the threshold amount, the method can continue to step 706 where the controller 500 can terminate a connected data transfer session. The controller 500 can terminate a connected data transfer session based on one or more factors, such as a timestamps value, assigned priority, ranking, etc. The method can then return to step 702.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   determining a total resource usage of connected data transfer sessions between computing nodes to transfer data through a computing network, wherein the computing network is a software-defined network and includes at least an overlay network layered over a physical network infrastructure of the computing network;
   determining whether the total resource usage of connected data transfer sessions meets or exceeds a threshold value, wherein the threshold value is dynamically lowered when the total resource usage is anticipated as higher than an average resource usage and dynamically raised when the total resource usage is anticipated as lower than the average resource usage; and
   in response to a determination that the total resource usage of connected data transfer sessions meets or exceeds the threshold value, terminating at least one connected data transfer session of the connected data transfer sessions until the total resource usage of the connected data transfer sessions is less than the threshold value.

2. The computer-implemented method of claim 1, wherein the termination of the at least one connected data transfer sessions is based on time stamp values corresponding to the one or more connected data transfer sessions.

3. The computer-implemented method of claim 1, wherein the termination of the at least one connected data transfer sessions is based on lack of usage for at least a specific period of time.

4. The computer-implemented method of claim 1, wherein the termination of the at least one connected data transfer sessions is based on priority of application, service or computing nodes utilizing the connected data transfer sessions.

5. The computer-implemented method of claim 1, further comprising:
   re-establishing the at least one terminated connected data transfer session when the total resource usage is less than the threshold value.

6. The computer-implemented method of claim 1, further comprising:
   ranking the connected data transfer sessions based on one or more ranking criterion, yielding a session ranking, wherein the terminating is based on the session ranking.

7. A system comprising:
   at least one processor; and
   at least one memory storing instructions, which when executed by the at least one processor, causes the at least one processor to:
   determine a total resource usage of connected data transfer sessions between computing nodes to transfer data through a computing network, wherein the computing network is a software-defined network and includes at least an overlay network layered over a physical network infrastructure of the computing network;
   determine whether the total resource usage of connected data transfer sessions meets or exceeds a threshold value, wherein the threshold value is dynamically lowered when the total resource usage is anticipated as higher than an average resource usage and dynamically raised when the total resource usage is anticipated as lower than the average resource usage; and
   in response to a determination that the total resource usage of connected data transfer sessions meets or exceeds the threshold value, terminate at least one connected data transfer session of the connected data transfer sessions until the total resource usage of the connected data transfer sessions is less than the threshold value.

8. The system of claim 7, wherein the termination of the at least one connected data transfer sessions is based on time stamp values corresponding to the one or more connected data transfer sessions.

9. The system of claim 7, wherein the termination of the at least one connected data transfer sessions is based on lack of usage for at least a specific period of time.

10. The system of claim 7, wherein the termination of the at least one connected data transfer sessions is based on priority of application, service or computing nodes utilizing the connected data transfer sessions.

11. The system of claim 7, further comprising instructions, which when executed by the at least one processor, causes the at least one processor to:
    re-establish the at least one terminated connected data transfer session when the total resource usage is less than the threshold value.

12. The system of claim 7, further comprising instructions, which when executed by the at least one processor, causes the at least one processor to:
    rank the connected data transfer sessions based on one or more ranking criterion, yielding a session ranking, wherein the termination is based on the session ranking.

13. At least one non-transitory computer readable medium storing instructions, which when executed by at least one processor, causes the at least one processor to:
    determine a total resource usage of connected data transfer sessions between computing nodes to transfer data through a computing network, wherein the computing network is a software-defined network and includes at least an overlay network layered over a physical network infrastructure of the computing network;
    determine whether the total resource usage of connected data transfer sessions meets or exceeds a threshold value, wherein the threshold value is dynamically lowered when the total resource usage is anticipated as higher than an average resource usage and dynamically raised when the total resource usage is anticipated as lower than the average resource usage; and
    in response to a determination that the total resource usage of connected data transfer sessions meets or exceeds the threshold value, terminate at least one connected data transfer session of the connected data transfer sessions until the total resource usage of the connected data transfer sessions is less than the threshold value.

14. The at least one non-transitory computer readable medium of claim 13, wherein the termination of the at least one connected data transfer sessions is based on time stamp values corresponding to the one or more connected data transfer sessions.

15. The at least one non-transitory computer readable medium of claim 13, wherein the termination of the at least one connected data transfer sessions is based on lack of usage for at least a specific period of time.

16. The at least one non-transitory computer readable medium of claim 13, wherein the termination of the at least one connected data transfer sessions is based on priority of application, service or computing nodes utilizing the connected data transfer sessions.

17. The at least one non-transitory computer readable medium of claim 13, further comprising instructions, which when executed by the at least one processor, causes the at least one processor to:
    re-establish the at least one terminated connected data transfer session when the total resource usage is less than the threshold value.

18. The at least one non-transitory computer readable medium of claim 13, further comprising instructions, which when executed by the at least one processor, causes the at least one processor to:
    rank the connected data transfer sessions based on one or more ranking criterion, yielding a session ranking, wherein the termination is based on the session ranking.

* * * * *